US011206061B2

(12) United States Patent
Cabble et al.

(10) Patent No.: US 11,206,061 B2
(45) Date of Patent: Dec. 21, 2021

(54) DYNAMIC FREQUENCY TUNING FOR INDUCTIVE COUPLING SYSTEMS

(71) Applicant: ASSA ABLOY AB, Stockholm (SE)

(72) Inventors: Paul Cabble, Cardiff (GB); Peter Edmonds, Aberdare (GB)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/705,574

(22) Filed: Dec. 6, 2019

(65) Prior Publication Data
US 2021/0175934 A1  Jun. 10, 2021

(51) Int. Cl.
G06K 7/10 (2006.01)
H04B 5/00 (2006.01)
G06K 19/077 (2006.01)

(52) U.S. Cl.
CPC ....... *H04B 5/0062* (2013.01); *G06K 7/10198* (2013.01); *G06K 19/07777* (2013.01); *H04B 5/0031* (2013.01); *H04B 5/0081* (2013.01)

(58) Field of Classification Search
CPC ........... G06K 7/10009; G06K 7/10118; G06K 7/10148; G06K 7/10158; G06K 7/10168; G06K 7/10198
See application file for complete search history.

(56) References Cited

U.S. PATENT DOCUMENTS

| | | | | |
|---|---|---|---|---|
| 6,070,803 A | * | 6/2000 | Stobbe | G01S 13/753 235/384 |
| 6,476,708 B1 | * | 11/2002 | Johnson | G06K 7/0008 340/10.34 |
| 8,219,053 B2 | * | 7/2012 | Mejia | G06K 7/0008 455/193.1 |
| 2007/0001816 A1 | * | 1/2007 | Lindley | G06K 7/0008 340/10.34 |
| 2012/0248186 A1 | * | 10/2012 | Chauvet | G06K 19/07767 235/439 |
| 2017/0124790 A1 | * | 5/2017 | Sample | G06K 7/10148 |
| 2017/0214433 A1 | * | 7/2017 | Redman-White | H04B 5/0025 |
| 2019/0098435 A1 | * | 3/2019 | Zeng | H01Q 1/52 |
| 2020/0167533 A1 | * | 5/2020 | Smirnov | G06K 7/0008 |

FOREIGN PATENT DOCUMENTS

| | | |
|---|---|---|
| EP | 1770665 | 4/2007 |
| EP | 2693407 | 2/2014 |
| WO | WO-2021110517 A1 | 6/2021 |

OTHER PUBLICATIONS

"International Application Serial No. PCT/EP2020/083415, International Search Report dated Feb. 16, 2021", 4 pgs.
"International Application Serial No. PCT/EP2020/083415, Written Opinion dated Feb. 16, 2021", 6 pgs.

* cited by examiner

*Primary Examiner* — Thien M Le
*Assistant Examiner* — April A Taylor
(74) *Attorney, Agent, or Firm* — Schwegman Lundberg & Woessner, P.A.

(57) ABSTRACT

This disclosure describes techniques for operating an inductive coupling reader. The techniques include operations comprising: applying an excitation frequency to a resonance circuit of the inductive coupling reader; detecting a change to a resonance frequency of the resonance circuit of the inductive coupling reader; and in response to detecting the change to the resonance frequency of the inductive coupling reader, adjusting the excitation frequency being applied to the resonance circuit.

19 Claims, 5 Drawing Sheets

DYNAMIC FREQUENCY TUNING FOR INDUCTIVE COUPLING SYSTEMS

FIELD OF THE DISCLOSURE

This document pertains generally, but not by way of limitation, to Radio Frequency Identification (RFID) systems and, more particularly, to techniques for reducing harmful interference effects in RFID systems.

BACKGROUND

An RFID system is a system that uses radio frequency transponders (e.g., tags) to identify items-of-interest. Each radio frequency transponder is attached to or near a corresponding item and includes information identifying that item. When an identification needs to be made, a radio frequency reader unit (e.g., an interrogator) is used to excite (e.g., interrogate) the transponder on the item, which then transmits an identification signal (including the identification information for the item) back to the reader unit. The reader unit then uses the identification information received from the transponder to perform any of a number of different RFID applications. For example, the identification information can be used to perform functions such as asset management, inventory tracking, access control, and others.

SUMMARY OF THE DISCLOSURE

In some certain embodiments, a system and method are provided for operating an inductive coupling reader. The disclosed system and method perform operations comprising: applying an excitation frequency to a resonance circuit of the inductive coupling reader; detecting a change to a resonance frequency of the resonance circuit of the inductive coupling reader; and in response to detecting the change to the resonance frequency of the inductive coupling reader, adjusting the excitation frequency being applied to the resonance circuit.

In some embodiments, the change in the resonance frequency is caused by an external metal material in close proximity to the inductive coupling reader, and a range of the inductive coupling reader is reduced as a result of the change in the resonance frequency.

In some embodiments, detecting the change comprises accessing configuration information for the inductive coupling reader, the configuration information indicating that the inductive coupling reader is in close proximity to external metal material.

In some embodiments, the resonance circuit comprises a tuned oscillating circuitry configured to generate a fixed resonance frequency at 125 kHz or 134 kHz.

In some embodiments, the operations comprise: applying a first excitation frequency to the resonance circuit of the inductive coupling reader; measuring a first amplitude of a first voltage across the resonance circuit of the inductive coupling reader resulting from applying the first excitation frequency; and determining that the first amplitude of the first voltage fails to satisfy a criterion.

In some embodiments, the criterion comprises a predetermined voltage level.

In some embodiments, the criterion comprises exceeding a voltage level resulting from application of a second excitation frequency.

In some embodiments, the operations comprise: applying a second excitation frequency to the resonance circuit of the inductive coupling reader; measuring a second amplitude of a second voltage across the resonance circuit of the inductive coupling reader resulting from applying the second excitation frequency; and determining that the first amplitude of the first voltage is less than the second amplitude of the second voltage.

In some embodiments, adjusting the excitation frequency being applied to the resonance circuit comprises setting the excitation frequency to the second excitation frequency.

In some embodiments, the second excitation frequency is higher or lower than the first excitation frequency by a predetermined amount.

In some embodiments, the operations comprise causing an inductive coupling device, inductively coupled to the inductive coupling reader, to operate at the adjusted excitation frequency, where the inductive coupling device derives a clock frequency from the adjusted excitation frequency such that data transfer between the inductive coupling device and the inductive coupling reader is synchronous with the adjusted excitation frequency.

In some embodiments, the inductive coupling device comprises a Radio Frequency Identification (RFID) credential device.

In some embodiments, the inductive coupling reader comprises a Radio Frequency Identification (RFID) reader.

In some embodiments, the adjustment to the excitation frequency is determined by: applying a range of frequencies to the resonance circuit; and identifying a frequency that causes a maximum voltage amplitude to be generated at an output of the inductive coupling reader.

Metal material in close proximity to conventional RFID readers typically reduces the range of the conventional RFID readers because the metal material changes the resonance frequency of the resonance circuit of the RFID readers. The disclosed embodiments detect interference, such as that caused by metal material, and, in response, adjust the excitation (driving) frequency being applied to the resonance circuit. In this way, the overall power efficiency and range of the disclosed RFID reader is improved over conventional RFID readers.

This overview is intended to provide an overview of subject matter of the present patent application. It is not intended to provide an exclusive or exhaustive explanation of the inventive subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

This disclosure describes, among other things, techniques for operating an inductive coupling reader. Specifically, the disclosed techniques detect interference and detuning of the resonance circuit of the inductive coupling reader and, in response, adjust the excitation (driving) frequency being applied to the resonance circuit. In this way, the overall power efficiency and range of inductive coupling readers, such as RFID readers, is improved, which improves the overall efficiency and functioning of the computer.

In an RFID system, a problem arises when one or more external interference signals are present within the frequency band of the system during an interrogation operation. Such interference will often cause misidentification of items-of-interest and faulty reporting in the RFID system. Increasingly, such interference is being caused by metal material located near the system-of-interest. Such metal material significantly reduces the range of the RFID interrogator, particularly because such metal material changes the resonance frequency of the resonance circuit of the RFID interrogator. For example, if an inductive coupling reader (e.g., a 13.56 MHz RFID reader) is mounted on a metal surface, the apparent inductance of its antenna will change. As the antenna is part of a parallel resonance circuit that is used to communicate with an RFID transponder (e.g., a credential, such as an RFID tag), the actual performance (e.g., read range) will degrade due to the detuning of this circuit, particularly because the driving frequency will not match the resonance frequency of the antenna. This will also cause the RFID reader to consume more power to read a given RFID tag, which wastes system resources.

To address the shortcomings of such typical scenarios, the disclosed techniques detect circumstances in which the resonance circuit of the inductive coupling reader is detuned and compensates for such detuning by modifying the excitation (driving) frequency being applied to the resonance circuit. This enables performance of the inductive coupling reader to be recovered and improved, which enhances the power efficiency and range of the inductive coupling reader. As such, the overall efficiency and functioning of the computer is improved.

Figure 1:
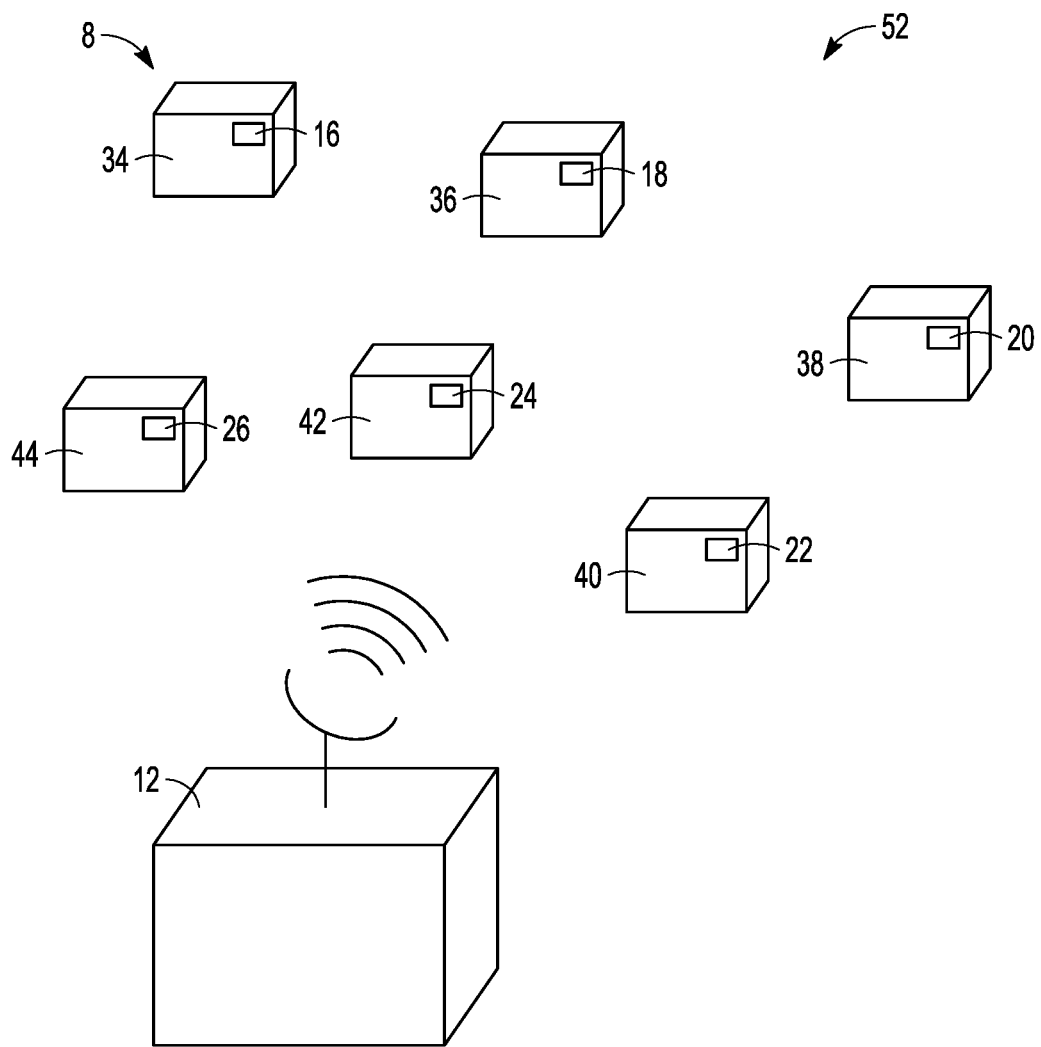
FIG. 1 is a block diagram illustrating an RFID system in accordance with various embodiments.

FIG. 1 is a block diagram illustrating an RFID system according to some embodiments. As illustrated, an RFID system 8 includes: an RF reader unit 12 (inductive coupling reader) and a plurality of RF identification tags 16, 18, 20, 22, 24, 26 that are each attached to a corresponding item-of-interest 34, 36, 38, 40, 42, and 44 for use in identifying the item-of-interest. The items-of-interest 34, 36, 38, 40, 42, and 44 can include, for example, pieces of inventory, personnel, capital assets, animals, or any other objects for which it may be desirable to track or monitor within a particular region. The number of items that a particular reader is capable of tracking is generally a matter of design choice.

The RF reader unit 12 can be a stationary unit, such as wall mounted proximity readers, or a portable unit that can be easily relocated. In general, the coverage region serviced by an RF reader unit will be a function of the transmit power level of the reader, the antenna pattern of the reader transmit antenna, and the location and orientation of the reader at any particular time.

During normal operation of the example system of FIG. 1, the RF reader unit 12 periodically interrogates its coverage region 52 to identify the items-of-interest that are presently located therein. That is, the reader unit 12 periodically transmits an RF interrogation signal within the coverage region 52 that acts as a "request" for each of the RF identification tags 16-26 within the region 52 to transmit its identification signal identifying the associated item-of-interest. The RF interrogation signal drives a resonance circuit at a particular frequency that matches the resonance frequency of the resonance circuit. The RF tag receives the RF interrogation signal and derives a local clock frequency based on the RF interrogation signal. The RF tag synchronizes the exchange of data with the reader unit 12 according to the local clock frequency and, in turn, the drive frequency of the RF interrogation signal. Each of the RF tags within the coverage region 52 receives the interrogation signal and responds by transmitting its identification signal back to the interrogating reader. After receiving identification information from all of the RF tags within its coverage region 52, the RF reader unit reports the collected information to an appropriate entity.

With reference to FIG. 1, it can be appreciated that some interference between the RF reader unit 12 and metal material is likely to occur. For example, the RF reader unit 12 may be wall mounted on a wall that includes metal material. Such metal material can influence the resonance circuit of the RF reader unit 12 and change the resonance frequency of the resonance circuit. This can reduce the range of the RF reader unit 12, causing the RF reader unit 12 to misidentify or fail to identify items within the region 52 that are further away from the RF reader unit 12. Particularly, while the resonance frequency of the resonance circuit changes, the drive frequency of the interrogation signal may correspond to the expected resonance frequency under conditions in which interference is not present. Because the drive frequency and resonance frequency mismatch, the overall power consumed by the system increases and range of the RF reader unit 12 decreases. Namely, the size of the region 52 may be reduced when metal material is present in proximity to the RF reader unit 12. Also, the amount of power needed by the RF reader unit 12 to properly operate may be increased because the resonance frequency of the RF reader unit 12 changes.

In accordance with the present disclosure, a method and apparatus are provided for reducing the negative effects of interference within an RFID system by modifying the excitation (drive) frequency that is applied to the resonance circuit to compensate for metal material determined to cause changes to the resonance frequency of the RF reader unit 12.

Figure 2A:
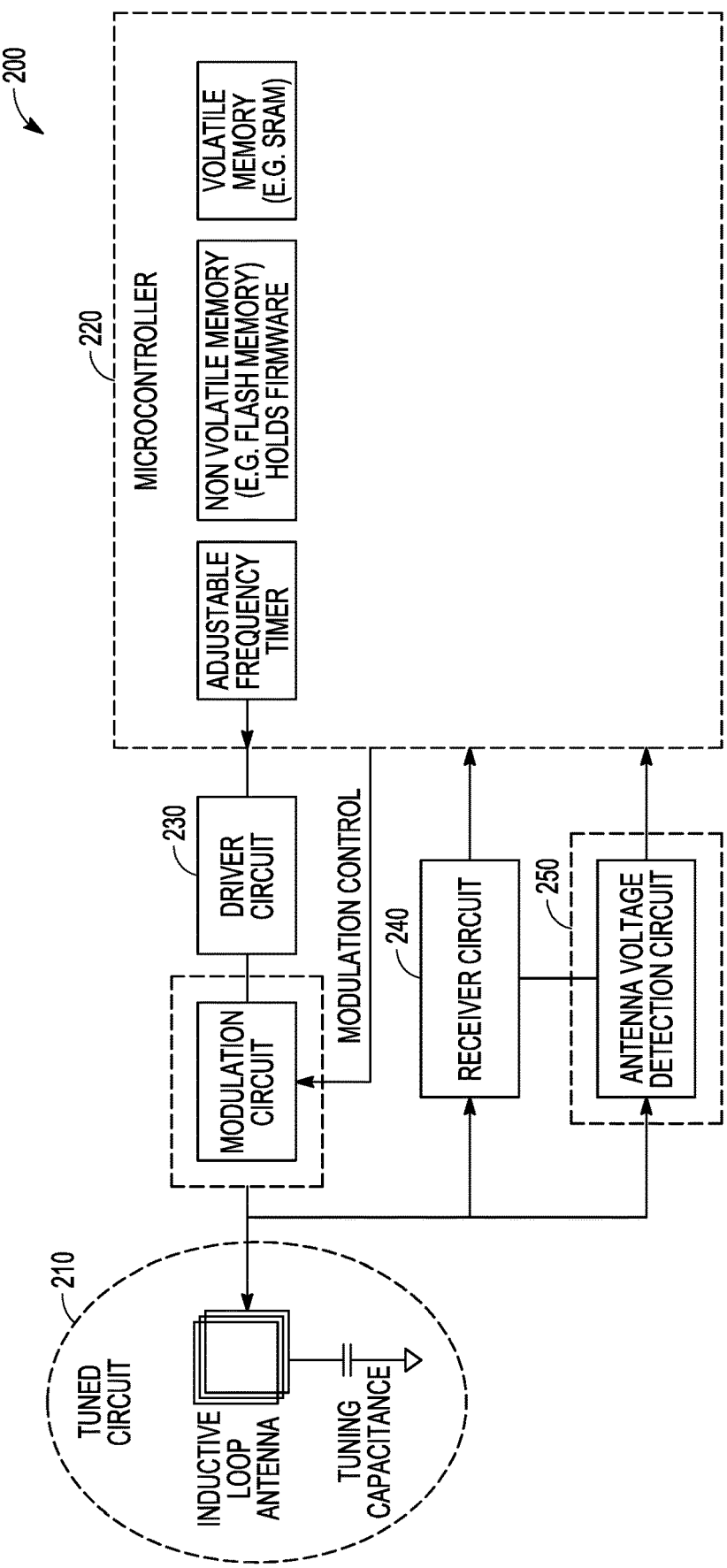
FIG. 2A is a block diagram illustrating a reader unit for use in an RFID system in accordance with various embodiments.

FIG. 2A is a block diagram illustrating an RF reader unit 200 in accordance with one embodiment of the present disclosure. RF reader unit 200 may be illustrative of RF reader unit 12 (FIG. 1). As illustrated, the reader unit 200 can include: a tuned circuit 210, a driver circuit 230, a receiver circuit 240, an antenna voltage detection circuit 250, and a microcontroller 220. In some implementations, the antenna voltage detection circuit 250 can be excluded or deactivated from the RF reader unit 200.

The microcontroller 220 is operative for controlling the operation of the RF reader unit 200 in order to interrogate, track, and report on items-of-interest within the coverage region 52 of the RF reader unit 200. The microcontroller 220 is implemented using a digital processing device, such as a general purpose microprocessor, a digital signal processor, a reduced instruction set computer, a complex instruction set computer, or a field programmable gate array. In addition, one or more of the other functional blocks illustrated in FIG. 2A can also be implemented digitally within the same (or a different) digital processor as the microcontroller 220. The microcontroller 220 can include an adjustable frequency timer and volatile and non-volatile memory.

The tuned circuit 210 includes an inductive loop antenna and tuning capacitance. The tuned circuit 210 is used to generate and transmit interrogation signals (under the control of the microcontroller 220 and driver circuit 230) for transmission into the coverage region 52 via the inductive loop antenna during an interrogation operation. The receiver circuit 240 is operative for, among other things, receiving, demodulating, and decoding identification signals received from RF tags located within the coverage region 52 and for delivering the resulting identification information to the microcontroller 220.

In some embodiments, the microcontroller 220 detects a change in a resonance frequency of the RF reader unit 200. Specifically, the microcontroller 220 detects a change in the resonance frequency of the tuned circuit 210. In some implementations, the microcontroller 220 detects the change in the resonance frequency based on a pre-configured setting of the microcontroller 220 that is stored in the non-volatile memory of the microcontroller 220. For example, during operation or during manufacture of the RF reader unit 200, a configuration bit stored in the non-volatile memory of the microcontroller 220 may indicate presence or lack of presence of an interference source, such as a metal material. The microcontroller 220 may access that configuration bit, during operation, and determine whether the configuration bit is asserted or de-asserted. If the configuration bit is asserted, the microcontroller 220 determines that an interference source, such as a metal material, is present or within a close proximity to the RF reader unit 200. In such cases, the microcontroller 220 detects a change in the resonance frequency of the RF reader unit 200. If the configuration bit is de-asserted, the microcontroller 220 determines that there is no presence of an interference source.

In some embodiments, the microcontroller 220 communicates with the antenna voltage detection circuit 250 to determine and detect a change in the resonance frequency of the RF reader unit 200. Specifically, the microcontroller 220 may measure an amount of voltage consumed by the tuned circuit 210 using the antenna voltage detection circuit 250 when an interrogation signal with a given excitation frequency is applied to the tuned circuit 210. The given excitation frequency that is applied matches the expected resonance frequency of the tuned circuit 210 (e.g., the resonance frequency the tuned circuit 210 normally operates at when no interference sources are present). For example, the tuned circuit 210 may be configured to operated at a resonance frequency of 125 kHz or 134 kHz or any other suitable value. In such cases, the excitation frequency of the interrogation signal is also set to 125 kHz or 134 kHz to match the resonance frequency. If the amount of voltage fails to satisfy a threshold or falls below a specified threshold value (e.g., because the resonance frequency does not match the excitation frequency), the microcontroller 220 detects the change in the resonance frequency.

In response to determining that the resonance frequency of the tuned circuit 210 has changed, the microcontroller 220 adjusts the excitation frequency of the interrogation signal using the adjustable frequency timer to offset the change in the resonance frequency. For example, if the resonance frequency is 10% higher than the expected resonance frequency, the microcontroller 220 increases the excitation frequency by 10%.

The preset threshold against which the voltage measured by the antenna voltage detection circuit 250 is compared against may be set to a value that is 10% (or any other suitable percentage or value) higher or 10% (or any other suitable percentage or value) lower than the value of the voltage consumed by the tuned circuit 210 when no metal material is in close proximity to the RF reader unit 200. The preset threshold may be programmed into a look-up table or memory during manufacture of the RF reader unit 200 and/or may be dynamically updated based on different operating conditions. In some cases, the preset threshold may be a particular value or may be a range of values. If the measured voltage falls outside of the range of values, the microcontroller 220 detects a change in the resonance frequency and adjusts the excitation frequency of the interrogation circuit by a specified amount.

In some cases, the microcontroller 220 instructs the driver circuit 230 to operate at a first frequency or a second frequency. The first frequency may correspond to the resonance frequency of the tuned circuit 210 under normal conditions when no interference sources are present. In response to detecting a change in the resonance frequency (e.g., based on a configuration bit value or a measured voltage), the microcontroller 220 instructs the driver circuit 230 to operate at a second frequency which is higher or lower than the first frequency.

In some embodiments, the microcontroller 220 searches for the optimal excitation frequency of the interrogation signal based on voltage values measured by the antenna voltage detection circuit 250. For example, the microcontroller 220 may initially drive the tuned circuit 210 at a first frequency corresponding to the resonance frequency of the tuned circuit 210 under normal conditions when no interference sources are present. The microcontroller 220 receives a first voltage measurement from the antenna voltage detection circuit 250. The microcontroller 220 stores this first voltage measurement in the volatile memory of the microcontroller 220. Next, the microcontroller 220 increases the excitation frequency to drive the tuned circuit 210 at a second frequency that is higher than the first frequency. The microcontroller 220 receives a second voltage measurement from the antenna voltage detection circuit 250. The microcontroller 220 compares the second voltage measurement to the first voltage measurement. In response to determining that the second voltage measurement is greater than the first voltage measurement, the microcontroller 220 may increase the excitation frequency to drive the tuned circuit 210 at a third frequency that is higher than the second frequency. Alternatively, in response to determining that the second voltage measurement is greater than the first voltage measurement, the microcontroller 220 may set the excitation frequency to drive the tuned circuit 210 at the second frequency. In response to determining that the second voltage measurement is less than the first voltage measurement, the microcontroller 220 may decrease the excitation frequency to drive the tuned circuit 210 at a third frequency that is lower than the first frequency. Alternatively, in response to determining that the second voltage measurement is less than the first voltage measurement, the microcontroller 220 may set the excitation frequency to drive the tuned circuit 210 at the first frequency.

The microcontroller 220 again compares the resulting voltage measured by the antenna voltage detection circuit 250 due to driving the tuned circuit 210 at the third frequency with the voltage resulting from driving the tuned circuit 210 at the prior frequency. In case the third frequency corresponds to a frequency that is higher than the prior applied frequency, the microcontroller 220 may continue gradually increasing the drive frequency by specified amounts until the resulting voltage is less than the previously measured voltage. In case the third frequency corresponds to a frequency that is lower than the prior applied frequency, the microcontroller 220 may continue gradually decreasing the drive frequency by specified amounts until the resulting voltage is less than the previously measured voltage. At that point, the microcontroller 220 sets the drive frequency to the frequency that resulted in the previously measured voltage. Namely, the microcontroller 220 searches for the frequency (by gradually increasing or decreasing the drive frequency) that results in the maximum voltage measurement output by the antenna voltage detection circuit 250.

Figure 2B:
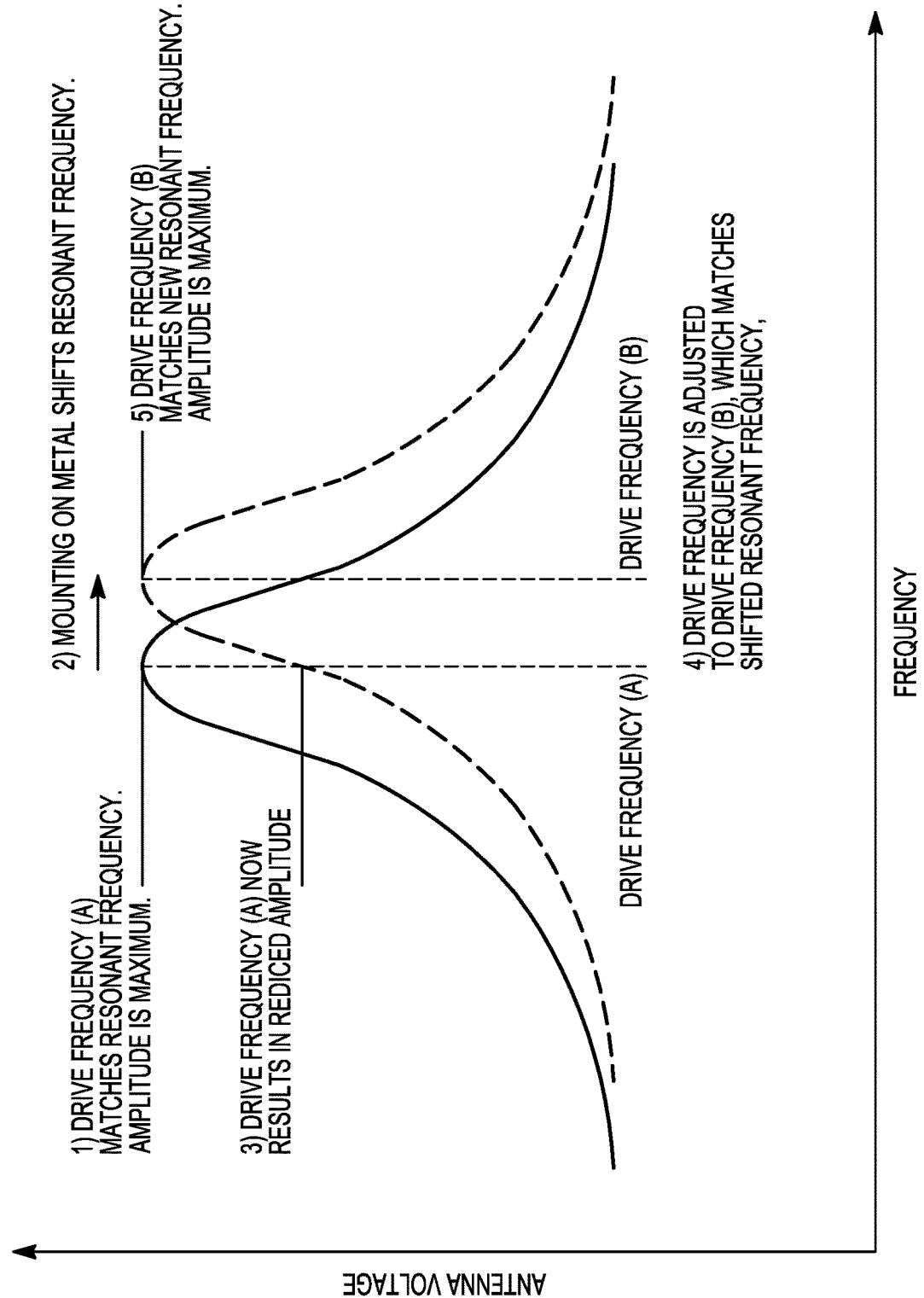
FIG. 2B is an illustrative RFID system driving versus resonance frequency waveform in accordance with various embodiments.

FIG. 2B is an illustrative RFID system driving frequency versus resonance frequency waveform in accordance with various embodiments. As shown in FIG. 2B, the antenna voltage (and thereby the range of the RFID system) is reduced as the drive frequency of the interrogation signal applied to the resonance circuit mismatches the resonance frequency of the resonance circuit. As shown in FIG. 2B, the antenna voltage is at a maximum value when the drive frequency matches the resonance or resonant frequency of the resonance circuit. Specifically, under normal operating conditions when no interference sources, such as metal material, are present or in close proximity to the RF reader unit 200, the resonance frequency of the resonance circuit is a preset value of 125 kHz or 134 kHz. The excitation frequency of the interrogation signal applied to the resonance circuit is also 125 kHz or 134 kHz and is set to equal or match the value of the resonance frequency. The resulting voltage measured by the antenna voltage detection circuit 250 is close to or at a maximum value. At a later point, the RF reader unit 200 is placed in close proximity to an interference source, such a metal material, which changes the resonance frequency of the resonance circuit (e.g., from 125 kHz to 135 kHz). Driving the resonance circuit at the currently set excitation frequency (e.g., at 125 kHz) results in a reduced voltage measurement provided by the antenna voltage detection circuit 250 relative to the previously measured maximum voltage value. In response, the excitation frequency is increased or decreased by a specified amount which may match the changed resonance frequency of the resonance circuit. Driving the resonance circuit at the adjusted excitation frequency (e.g., at 135 kHz) results in a voltage measurement provided by the antenna voltage detection circuit 250 that is close to or that equals the maximum value.

In such cases, an inductive coupling device (e.g., an RF tag) receives the RF interrogation signal at the adjusted excitation frequency and derives a local clock frequency based on the RF interrogation signal (e.g., at 135 kHz). The inductive coupling device synchronizes the exchange of data with the reader unit 12 according to the local clock frequency and, in turn, the adjusted excitation (drive) frequency of the RF interrogation signal.

Figure 3:
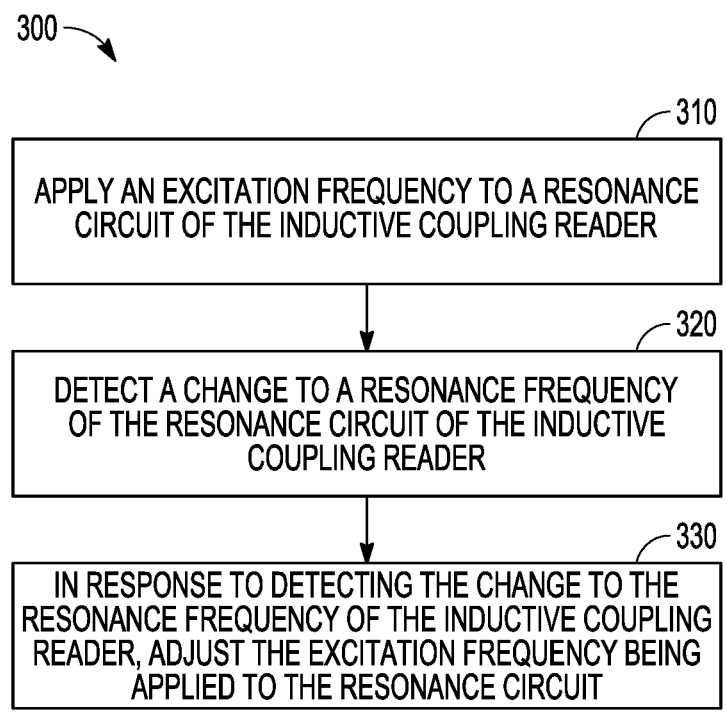
FIG. 3 is a flow diagram depicting an example process for operating an inductive coupling reader in accordance with various embodiments.

FIG. 3 is a flow diagram depicting an example process 300 for operating an inductive coupling reader in accordance with various embodiments.

At operation 310, the inductive coupling reader applies an excitation frequency to a resonance circuit of the inductive coupling reader.

At operation 320, the inductive coupling reader detects a change to the resonance frequency of the resonance circuit of the inductive coupling reader.

At operation 330, the inductive coupling reader adjusts the excitation frequency being applied to the resonance circuit in response to detecting the change to the resonance frequency of the inductive coupling reader.

Figure 4:
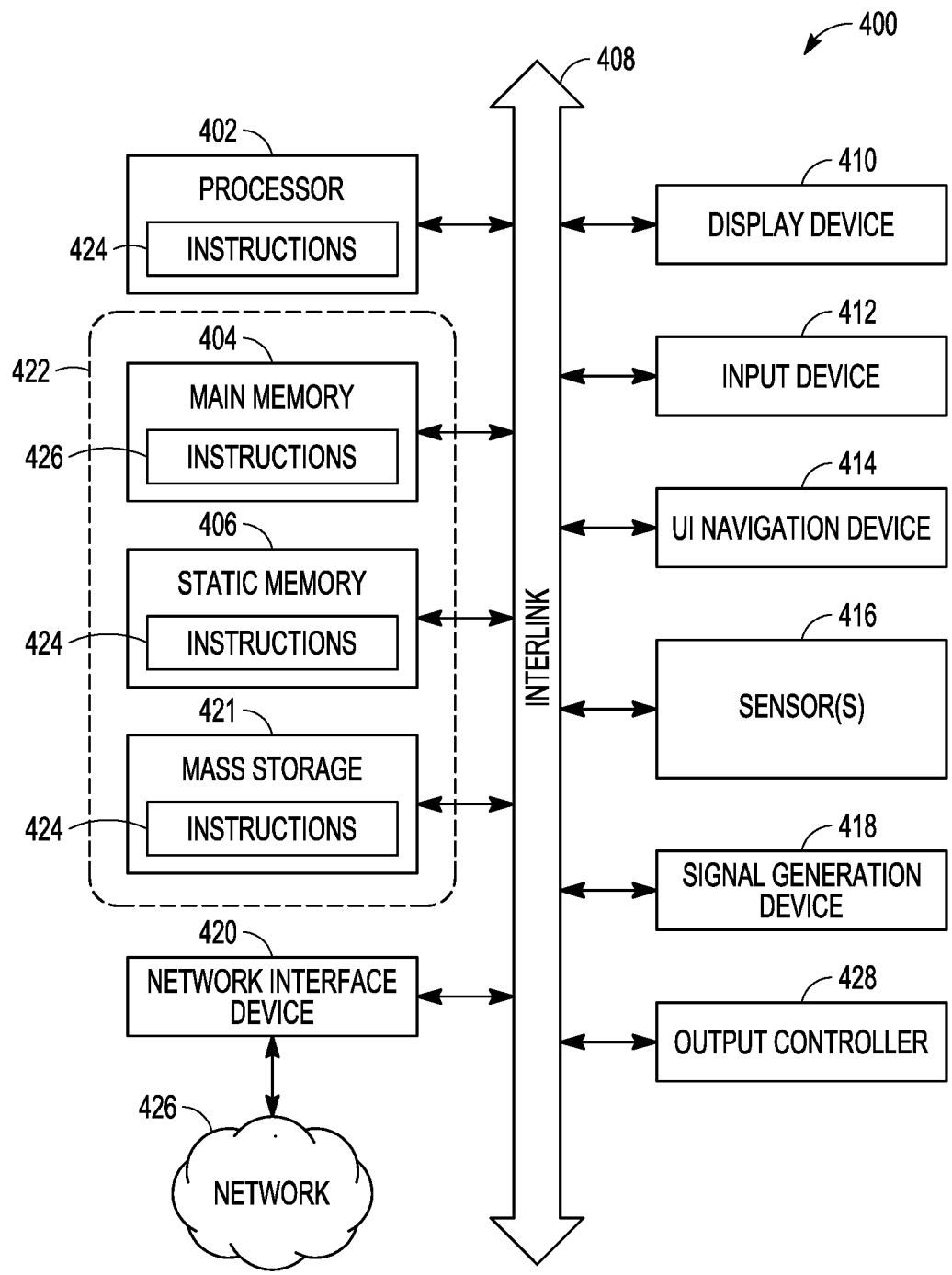
FIG. 4 is a block diagram illustrating an example of a machine upon which one or more embodiments may be implemented.

FIG. 4 is a block diagram of an example machine 400 upon which any one or more of the techniques (e.g., methodologies) discussed herein may be performed and/or that may be included as part of an inductive coupling reader. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in a peer-to-peer (P2P) (or other distributed) network environment. The machine 400 may be a personal computer (PC), a tablet PC, a set-top box (STB), a personal digital assistant (PDA), a mobile telephone, a web appliance, an IoT device, an automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant-massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 400 may include a hardware processor 402 (e.g., a central processing unit (CPU), a graphics processing unit (GPU), a hardware processor core, or any combination thereof, such as a memory controller, etc.), a main memory 404, and a static memory 406, some or all of which may communicate with each other via an interlink (e.g., bus) 408. The machine 400 may further include a display device 410, an alphanumeric input device 412 (e.g., a keyboard), and a user interface (UI) navigation device 414 (e.g., a mouse). In an example, the display device 410, alphanumeric input device 412, and UI navigation device 414 may be a touchscreen display. The machine 400 may additionally include a storage device 422 (e.g., drive unit); a signal generation device 418 (e.g., a speaker); a network interface device 420; one or more sensors 416, such as a Global Positioning System (GPS) sensor, wing sensors, mechanical device sensors, temperature sensors, ICP sensors, bridge sensors, audio sensors, industrial sensors, a compass, an accelerometer, or other sensors. The machine 400 may include an output controller 428, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage device 422 may include a machine-readable medium on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 421 may constitute the machine-readable medium.

While the machine-readable medium is illustrated as a single medium, the term "machine-readable medium" may include a single medium or multiple media (e.g., a centralized or distributed database, or associated caches and servers) configured to store the one or more instructions 424.

The term "machine-readable medium" may include any transitory or non-transitory medium that is capable of storing, encoding, or carrying transitory or non-transitory instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 (e.g., software, programs, an operating system (OS), etc.) or other data that are stored on the storage device 421 can be accessed by the main memory 404 for use by the hardware processor 402. The main memory 404 (e.g., DRAM) is typically fast, but volatile, and thus a different type of storage from the storage device 421 (e.g., an SSD), which is suitable for long-term storage, including while in an "off" condition. The instructions 424 or data in use by a user or the machine 400 are typically loaded in the main memory 404 for use by the hardware processor 402. When the main memory 404 is full, virtual space from the storage device 421 can be allocated to supplement the main memory 404; however, because the storage device 421 is typically slower than the main memory 404, and write speeds are typically at least twice as slow as read speeds, use of virtual memory can greatly reduce user experience due to storage device latency (in contrast to the main memory 404, e.g., DRAM). Further, use of the storage device 421 for virtual memory can greatly reduce the usable lifespan of the storage device 421.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks), among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding, or carrying instructions for execution by the machine 400, and includes digital or analog communications signals or other tangible or intangible media to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system, device, article, composition, formulation, or process that includes elements in addition to those listed after such a term in a claim are still deemed to fall within the scope of that claim. Moreover, in the following claims, the terms "first," "second," "third," etc., are used merely as labels, and are not intended to impose numerical requirements on their objects.

Method examples described herein may be machine- or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly-language code, a higher-level-language code, or the like. Such code may include transitory or non-transitory computer-readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above detailed description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the detailed description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled.

What is claimed is:

1. A method for operating an inductive coupling reader, the method comprising:
    applying a first excitation frequency to a resonance circuit of the inductive coupling reader;
    measuring a first amplitude of a first voltage across the resonance circuit of the inductive coupling reader resulting from applying the first excitation frequency;
    comparing the first amplitude of the first voltage against a specified threshold that is set to a value that differs by a specified amount from a value of a voltage consumed by the resonance circuit in a lack of presence of an external interference-causing source; and
    in response to determining that the first amplitude of the first voltage transgresses the specified threshold, detecting a change to the resonance frequency of the resonance circuit of the inductive coupling reader; and
    in response to detecting the change to the resonance frequency of the inductive coupling reader, adjusting the first excitation frequency being applied to the resonance circuit.

2. The method of claim 1, wherein the change in the resonance frequency is caused by the external interference-causing source in close proximity to the inductive coupling reader, and wherein a range of the inductive coupling reader is reduced as a result of the change in the resonance frequency.

3. The method of claim 1, wherein detecting the change comprises retrieving, from non-volatile memory of the inductive coupling reader, a configuration bit that indicates presence or lack of presence of the external interference-causing source.

4. The method of claim 3, further comprising:
    determining whether the configuration bit is asserted or de-asserted during operation of the inductive coupling reader;
    in response to determining that the configuration bit is asserted during operation of the inductive coupling reader, detecting the change to the resonance frequency; and
    in response to determining that the configuration bit is de-asserted during operation of the inductive coupling reader, determining that there is no presence of the interference-causing source.

5. The method of claim 1, wherein the specified threshold is programmed into a memory of the inductive coupling reader during manufacture.

6. The method of claim 1, wherein the specified threshold is dynamically updated based on different operating conditions and includes a range of values.

7. The method of claim 1, further comprising:
    applying a second excitation frequency to the resonance circuit of the inductive coupling reader;
    measuring a second amplitude of a second voltage across the resonance circuit of the inductive coupling reader resulting from applying the second excitation frequency; and
    determining that the first amplitude of the first voltage is less than the second amplitude of the second voltage.

8. The method of claim 7, wherein adjusting the first excitation frequency being applied to the resonance circuit comprises setting the first excitation frequency to the second excitation frequency.

9. The method of claim 7, wherein the second excitation frequency is higher or lower than the first excitation frequency by a predetermined amount.

10. The method of claim 1, further comprising causing an inductive coupling device, inductively coupled to the inductive coupling reader, to operate at the adjusted first excitation frequency, wherein the inductive coupling device derives a clock frequency from the adjusted first excitation frequency such that data transfer between the inductive coupling device and the inductive coupling reader is synchronous with the adjusted first excitation frequency.

11. The method of claim 10, wherein the inductive coupling device comprises a Radio Frequency Identification (RFID) credential device.

12. The method of claim 1, wherein the inductive coupling reader comprises a Radio Frequency Identification (RFID) reader.

13. The method of claim 1, further comprising determining an adjustment to the first excitation frequency by:
  applying a range of frequencies to the resonance circuit; and
  identifying a frequency that causes a maximum voltage amplitude to be generated at an output of the inductive coupling reader.

14. A system comprising:
  an inductive coupling reader comprising one or more processors configured to perform operations comprising:
  applying a first excitation frequency to a resonance circuit of the inductive coupling reader;
  measuring a first amplitude of a first voltage across the resonance circuit of the inductive coupling reader resulting from applying the first excitation frequency;
  comparing the first amplitude of the first voltage against a specified threshold that is set to a value that differs by a specified amount from a value of a voltage consumed by the resonance circuit in a lack of presence of an external interference-causing source; and
  in response to determining that the first amplitude of the first voltage transgresses the specified threshold, detecting a change to the resonance frequency of the resonance circuit of the inductive coupling reader; and
  in response to detecting the change to the resonance frequency of the inductive coupling reader, adjusting the first excitation frequency being applied to the resonance circuit.

15. The system of claim 14, wherein the change in the resonance frequency is caused by the external interference-causing source in close proximity to the inductive coupling reader, and wherein a range of the inductive coupling reader is reduced as a result of the change in the resonance frequency.

16. The system of claim 14, wherein the change is detected by retrieving, from non-volatile memory of the inductive coupling reader, a configuration bit that indicates presence or lack of presence of the external interference-causing source.

17. A non-transitory machine-readable medium comprising non-transitory machine-readable instructions that, when executed by one or more processors, configure the one or more processors to perform operations comprising:
  applying a first excitation frequency to a resonance circuit of an inductive coupling reader;
  measuring a first amplitude of a first voltage across the resonance circuit of the inductive coupling reader resulting from applying the first excitation frequency;
  comparing the first amplitude of the first voltage against a specified threshold that is set to a value that differs by a specified amount from a value of a voltage consumed by the resonance circuit in a lack of presence of an external interference-causing source; and
  in response to determining that the first amplitude of the first voltage transgresses the specified threshold, detecting a change to the resonance frequency of the resonance circuit of the inductive coupling reader fails to satisfy a criterion; and
  in response to detecting the change to the resonance frequency of the inductive coupling reader, adjusting the first excitation frequency being applied to the resonance circuit.

18. The non-transitory machine-readable medium of claim 17, wherein the change in the resonance frequency is caused by the external interference-causing source in close proximity to the inductive coupling reader, and wherein a range of the inductive coupling reader is reduced as a result of the change in the resonance frequency.

19. The non-transitory machine-readable medium of claim 17, wherein the change is detected by retrieving, from non-volatile memory of the inductive coupling reader, a configuration bit that indicates presence or lack of presence of the external interference-causing source.

* * * * *